(12) United States Patent
Abadi

(10) Patent No.: US 11,192,623 B2
(45) Date of Patent: Dec. 7, 2021

(54) MONOLITHIC SPAR FOR A WING

(71) Applicant: THE BOEING COMPANY, Chicago, IL (US)

(72) Inventor: Frank Abadi, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 343 days.

(21) Appl. No.: 16/131,833

(22) Filed: Sep. 14, 2018

(65) Prior Publication Data

US 2020/0086969 A1  Mar. 19, 2020

(51) Int. Cl.
 B64C 3/18 (2006.01)

(52) U.S. Cl.
 CPC .............. B64C 3/185 (2013.01); B64C 3/187 (2013.01)

(58) Field of Classification Search
 CPC .......... B64C 3/185; B64C 3/18; B64C 1/065; B64C 1/064; B64C 70/08; B29D 27/26; B29D 27/18
 See application file for complete search history.

(56) References Cited

U.S. PATENT DOCUMENTS

| | | | |
|---|---|---|---|
| 1,773,357 A | 8/1930 | Griswold | |
| 5,476,704 A * | 12/1995 | Kohler | B29C 66/114 428/119 |
| 8,475,133 B2 * | 7/2013 | Baker | F03D 1/0683 416/226 |
| 10,072,416 B2 * | 9/2018 | Armbrust | E04B 1/2403 |
| 2008/0128552 A1 | 6/2008 | Namaizawa et al. | |
| 2017/0088249 A1 * | 3/2017 | Nieto | B29C 70/48 |
| 2017/0291682 A1 * | 10/2017 | Sullivan | B64C 3/185 |
| 2019/0202572 A1 * | 7/2019 | Pautis | B64D 27/18 |

FOREIGN PATENT DOCUMENTS

| | | |
|---|---|---|
| DE | 573303 C | 3/1933 |
| GB | 131019 A | 8/1919 |

OTHER PUBLICATIONS

European Patent Office Extended Search Report for Application No. 19197337.9-1010 dated Mar. 12, 2019.
European Patent Office Action for Application No. 19 197 337.9-1010 dated Jun. 22, 2021.

* cited by examiner

*Primary Examiner* — Joshua J Michener
*Assistant Examiner* — Cindi M Curry
(74) *Attorney, Agent, or Firm* — Patterson + Sheridan, LLP

(57) ABSTRACT

A spar for a wing includes a monolithic structure and a strut. The monolithic structure includes an upper chord, a lower chord, and a web positioned between the upper chord and the lower chord. The strut, distinct and separate from the monolithic structure, is coupled to the monolithic structure between the upper chord and the lower chord and extends across the web.

19 Claims, 4 Drawing Sheets

MONOLITHIC SPAR FOR A WING

TECHNICAL FIELD

Embodiments of the present disclosure relate to a monolithic spar, such as for use within a wing, particularly in an airplane.

BACKGROUND

Advancements in aeronautical engineering have resulted in a continuous trend toward improved aircraft manufacturing, reliability, and performance over the years. In the area of aircraft manufacturing, improved manufacturing techniques, such as computer assisted manufacturing and the use of composites, has reduced the amount of time to manufacture and assemble an aircraft. Further, in the area of aircraft reliability, among other things, engineers strive for redundancy of components. Although many advancements and improvements have been made in aircraft designs, there is still room for additional improvement in many of the parameters that quantify aircraft manufacturing, reliability, and performance. Accordingly, what may be needed are aircraft and aircraft components that result in improved aircraft manufacturing, reliability, and/or performance.

SUMMARY

The systems, methods, apparatus, and devices of the disclosure each have several aspects, no single one of which is solely responsible for its attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include a spar for a wing.

In one embodiment, a wing for an aircraft is disclosed. The wing includes a spar including a monolithic structure and a strut. The monolithic structure includes an upper chord, a lower chord, and a web positioned between the upper chord and the lower chord. The strut, distinct and separate from the monolithic structure, is coupled to the monolithic structure between the upper chord and the lower chord and extends across the web.

In another embodiment, a spar for a wing of an aircraft is disclosed. The spar includes a monolithic structure including an upper chord and a lower chord, and a strut coupled to the monolithic structure between the upper chord and the lower chord.

In another embodiment, a method of supporting a spar including a monolithic structure is disclosed. The method includes receiving stress from a wing with the monolithic structure of the spar positioned within and supporting the wing, and distributing the stress between an upper chord and a lower chord of the monolithic structure with a strut coupled to the monolithic structure.

Embodiments generally include methods, apparatus, and systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and equivalents thereof.

BRIEF DESCRIPTION OF ILLUSTRATIONS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
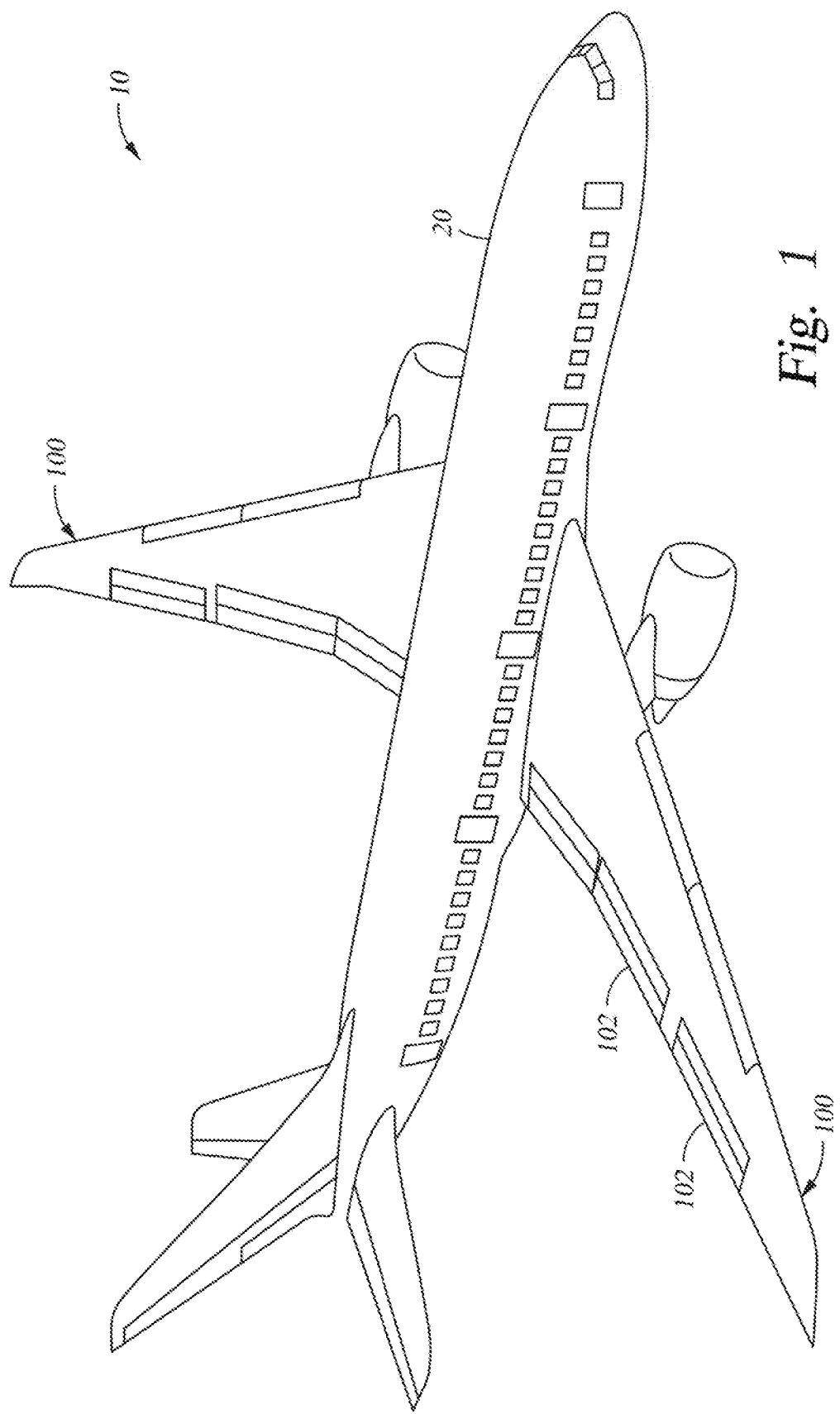
FIG. 1 is a perspective view of an airplane in accordance with one or more embodiments of the present disclosure.

Embodiments of the present disclosure provide apparatus, systems, and methods, for a monolithic spar of a wing.

In the following, reference is made to embodiments presented in the present disclosure. However, the scope of the present disclosure is not limited to specific described embodiments. Instead, any combination of the following features and elements, whether related to different aspects or not, is contemplated to implement and practice contemplated aspects. Furthermore, although embodiments disclosed herein may achieve advantages over other possible solutions or over the prior art, whether or not a particular advantage is achieved by a given aspect is not limiting of the scope of the present disclosure. Thus, the following embodiments, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za."

Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Wings are a component of an aircraft that provide lift. The present disclosure relates to a wing and a spar used within a wing, such as to facilitate manufacturing and assembly of the wing and increase the reliability provided by the wing. The spar for the wing includes a monolithic structure, in which the monolithic structure includes an upper chord and a lower chord. The monolithic structure may further include a web, a stiffener, and/or a rib post positioned between the upper chord and the lower chord. For example, the web, the stiffener, and/or the rib post may be integrally formed with and coupled to the upper chord and the lower chord.

A strut, distinct and separate from the monolithic structure or any component thereof, is coupled to the monolithic structure, such as by extending across the web. For example, the monolithic structure may further include an upper pad positioned adjacent the upper chord and a lower pad positioned adjacent the lower chord, in which the strut may be coupled to the upper pad and the lower pad. Further, the spar includes an inboard end and an outboard end. The strut is coupled to the monolithic structure with the strut positioned at an angle that is oriented toward the outboard of the spar such that an upper end of the strut is positioned closer to the outboard end than a lower end of the strut. In particular, the upper end of the strut that is positioned near or adjacent the upper chord is positioned nearest the outboard end of the spar, such as with respect to the lower end of the strut.

FIG. 1 is a perspective view of an airplane 10 in accordance with one or more embodiments of the present disclosure. The airplane 10 may generally be utilized to transport persons and/or cargo. The airplane 10, as shown, includes a fuselage 20 and a pair of wings 100 coupled to the fuselage 20. The wings 100 are coupled to opposite sides of the fuselage 20 with respect to each other. Further, as shown, the wings 100 may include one or more flaps 102 for directional control of the wings 100, and thus the airplane 10.

Figure 2:
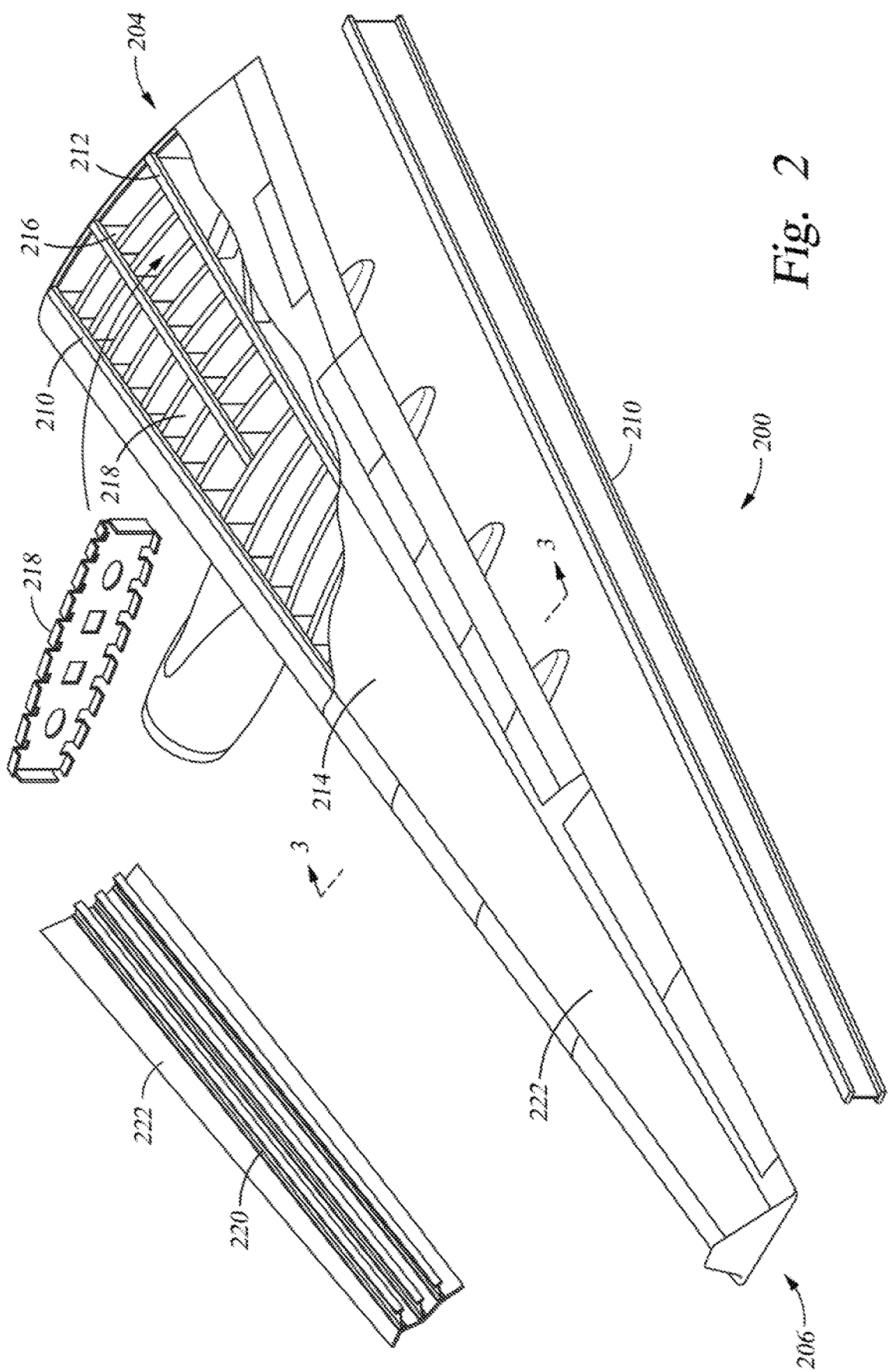
FIG. 2 is a perspective internal and partially disassembled view of a wing in accordance with one or more embodiments of the present disclosure.

FIG. 2 is a perspective internal and partially disassembled view of a wing 200. The wing 200 includes an inboard end 204 and an outboard end 206 with the inboard end 204 of the wing 200 used to be coupled to a fuselage of an airplane. One or more spars are included within the wing 200, in which the spars may extend across substantially an entire length of the wing 200 as a main component of structural support for the wing 200. For example, the wing 200 includes a front spar 210 and a rear spar 212 to define a wing box 214 for the wing 200. An example of the front spar 210 removed from the wing 200 is also provided in FIG. 2 for reference. The front spar 210 and the rear spar 212 may extend across the length of the wing 200. Further, if desired, a center spar 216 may be positioned between the front spar 210 and the rear spar 212, such as along a portion of the length of the wing 200. The center spar 216 may provide additional structural support, such as in the vertical direction, at the inboard end 204 of the wing 200.

One or more ribs 218 are included within the wing 200, such as coupled to the wing spars 210, 212 and/or 216, to provide additional structural support to the wing 200. For example, the ribs 218 are shown as distributed along the length of the wing 200 with each rib 218 coupled to and extending between the front spar 210 and the rear spar 212. The ribs 218 closer to the inboard end 204 of the wing 200 may also couple to the center spar 216, if present. An example rib 218 removed from the wing 200 is provided for reference.

In addition to the ribs 218, one or more stringers 220 may be included within the wing 200 to provide additional support. The wing 200 includes a top skin 222 positioned on top of and extending between the front spar 210 and the rear spar 212. FIG. 2 shows an underside of the top skin 222 for reference. One or more stringers 220 may be coupled or positioned between the top skin 222 and the ribs 218 to abut and provide support for the top skin 222. One or more additional components may also be included within the wing 200 depending on the needs and use of the wing 200. For example, components internal to the wing 200, such as the fuel tank and various electronics, may be included within the wing 200 prior to the top skin 222 (and/or bottom skin) being coupled to the wing 200. Components external to the wing 200, such wing flaps, ailerons, and/or other wing control surfaces may be coupled to the wing 200 after the top skin 222 is coupled to the wing 200.

Figure 3:
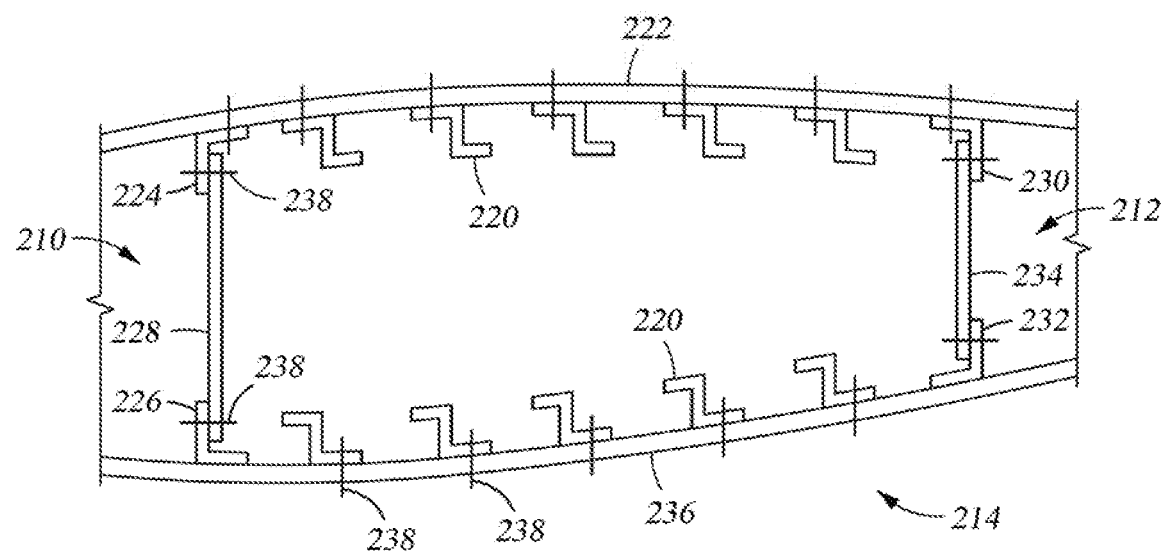
FIG. 3 is a cross-sectional view of a wing in accordance with one or more embodiments of the present disclosure.

FIG. 3 is a cross-sectional view of the wing 200, and more particularly the wing box 214. The wing 200 includes the front spar 210 and the rear spar 212. The front spar 210 includes an upper chord 224, a lower chord 226, and a web 228 extending between and coupled to the upper chord 224 and the lower chord 226. Similarly, the rear spar 212 includes an upper chord 230, a lower chord 232, and a web 234 extending between and coupled to the upper chord 230 and the lower chord 232. The upper chord 224 of the front spar 210 and the upper chord 230 of the rear spar 212 are both coupled to the top skin 222. Further, the lower chord 226 of the front spar 210 and the lower chord 232 of the rear spar 212 are both coupled to a bottom skin 236. Stringers 220 are also shown included within the wing box 214, in which the stringers 220 are separately coupled to the top skin 222 and to the bottom skin 236 to provide support to the top skin 222 and the bottom skin 236, respectively.

The components of the wing 200 may be coupled to each other using various methods that includes permanent and non-permanent joints or methods for coupling. A permanent method for coupling may include welding, and a non-permanent method for coupling may include the use of fasteners 238, as shown in FIG. 3. The fasteners 238 may include but are not limited to rivets, bolts, nuts, and/or screws. Accordingly, the stringers 220 may be coupled to the top skin 222 and to the bottom skin 236 using the fasteners 238. The chords 224, 226, 230, and 232 may also be coupled to the top skin 222 and to the bottom skin 236 using the fasteners 238. Furthermore, the web 228 of the front spar 210 may be coupled to the upper chord 224 and the lower chord 226 using fasteners 238, and the web 234 of the rear spar 212 may be coupled to the upper chord 230 and the lower chord 232 using fasteners 238.

Figure 4:
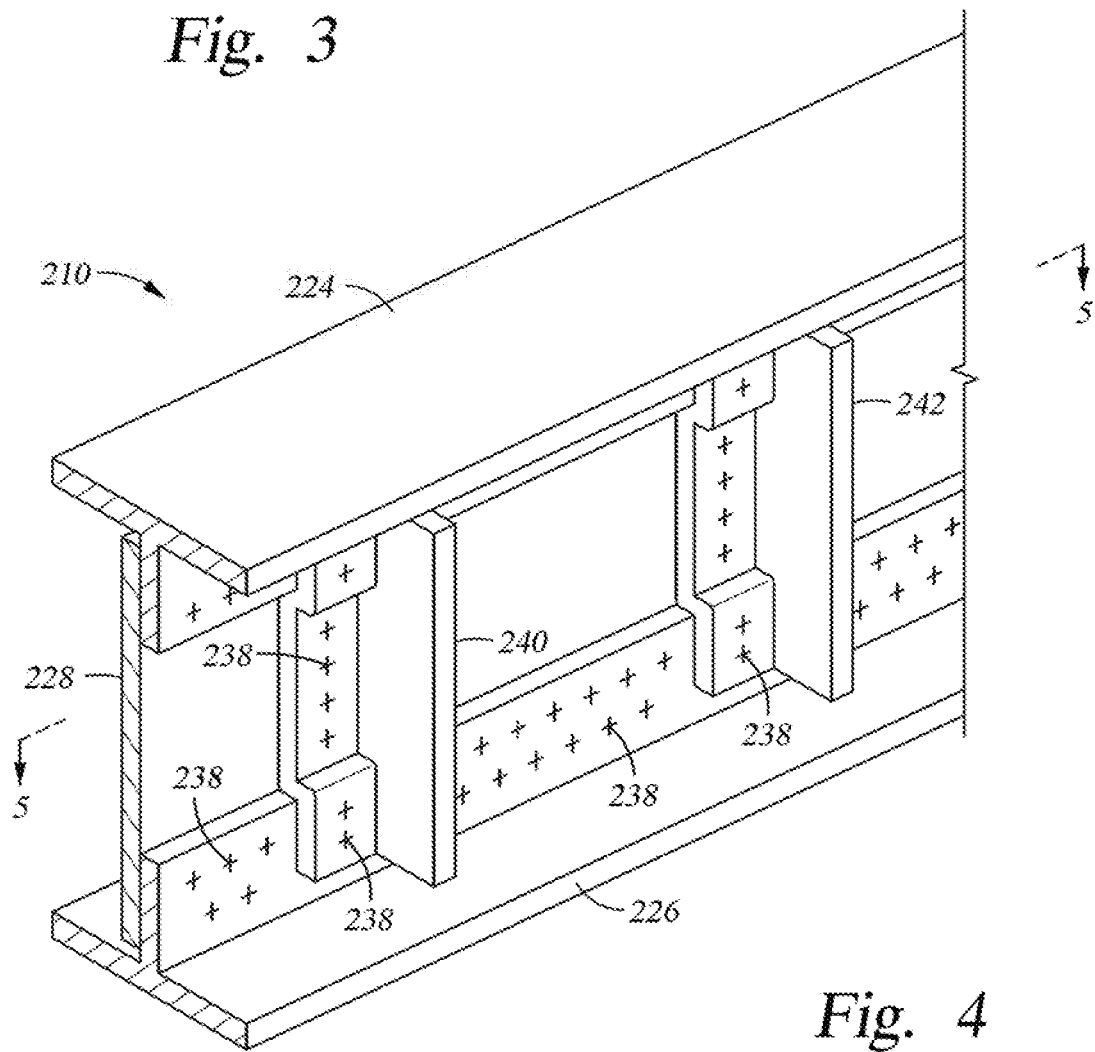
FIG. 4 is a perspective sectional view of a spar in accordance with one or more embodiments of the present disclosure.
Figure 5:
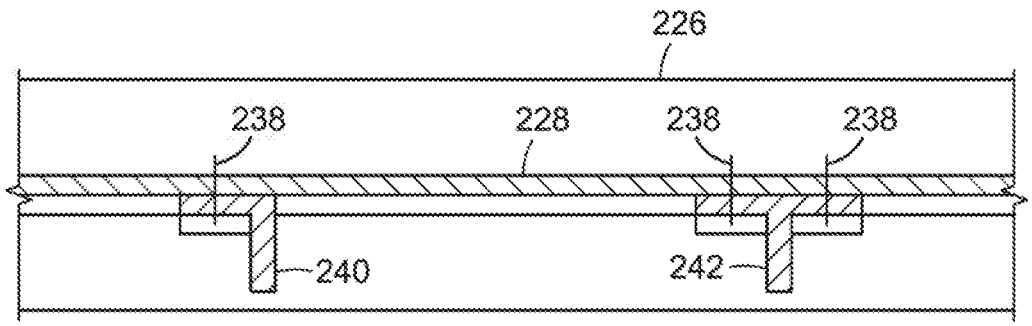
FIG. 5 is a cross-sectional view of a spar in accordance with one or more embodiments of the present disclosure.

FIG. 4 provides a perspective sectional view of a spar, such as the front spar 210, in accordance with one or more embodiments of the present disclosure, and FIG. 5 provides a cross-sectional view taken from the front spar 210 in accordance with one or more embodiments of the present disclosure. The front spar 210 includes the upper chord 224, the lower chord 226, and the web 228. The web 228 extends between and is coupled to the upper chord 224 and the lower chord 226, such as through the fasteners 238.

The spar 210 may also include one or more stiffeners 240 and/or one or more rib posts 242. The stiffener 240 may be positioned between the upper chord 224 and the lower chord 226, such as for the ends of the stiffener 240 to abut the upper chord 224 and the lower chord 226. Further, the stiffener 240 may be coupled to the upper chord 224, the lower chord 226, and the web 228, such as coupled using the fasteners 238. The stiffener 240, as shown best in FIG. 5, may have an L-shaped cross-section, but may also have other shaped cross-sections, such as I-shaped or T-shaped, without departing from the scope of the present disclosure. The stiffener 240 may be used to provide additional support to the spar 210, such as by facilitating the transfer of force between the upper chord 224, the lower chord 226, and even the web 228.

Similarly, the rib post 242 may be positioned between the upper chord 224 and the lower chord 226, such as for the ends of the rib post 242 to abut the upper chord 224 and the lower chord 226. The rib post 242 may be coupled to the upper chord 224, the lower chord 226, and the web 228, such as coupled using the fasteners 238. The rib post 242, as shown best in FIG. 5, may have an T-shaped cross-section, but may also have other shaped cross-sections, such as I-shaped or L-shaped, without departing from the scope of the present disclosure. The rib post 242 may be used to facilitate coupling ribs to the spar 210, such as by having the ribs 218 coupled to the front spar 210 and the rear spar 212 shown in FIG. 2.

In one embodiment, if stiffeners 240 and rib posts 242 are included within the spar 210, the stiffeners 240 and the rib posts 242 may both be used to provide additional support to the spar 210. In such an embodiment, the stiffeners 240 and the rib posts 242 may alternate in position with each other along the length of the spar 210. However, the present disclosure is not so limited, as, in one embodiment, stiffeners 240 may not be included within the spar 210, or at least along portions of the spar 210. Further, the ribs posts 242 may be positioned between about 26 inches to about 32 inches (about 66 cm to about 81 cm) from each other along the length of the spar 210. If the stiffeners 240 are included within the spar 210, the stiffeners 240 may similarly be positioned between about 26 inches to about 32 inches (about 66 cm to about 81 cm) from each other along the length of the spar 210.

In one or more embodiments, a wing and/or components thereof may vary in size or dimensions, such as when moving from end-to-end or front-to-back across the wing. For example, with reference back to FIG. 2, the wing 200 may vary or taper in dimensions, such as by decreasing in size and dimensions when moving from the inboard end 204 to the outboard end 206 of the wing 200. For example, in one embodiment, the spar 210 may have a height (e.g., distance between the upper chord 224 and the lower chord 226) of about 4 feet to about 5 feet (about 1.2 meters to about 1.5 meters) at the inboard end 204, and may have a height of about 12 inches to about 14 inches (about 30.5 cm to about 35.6 cm) at the outboard end 206. Thus, the spar 210 may decrease in height when moving from the inboard end 204 to the outboard end 206. Similarly, the thickness of the spar 210 and/or one or more components thereof may decrease in proportion to the height. For example, the web 228 between the upper chord 224 and the lower chord 226 may decrease in thickness when moving from the inboard end 204 to the outboard end 206, in which the decrease in thickness of the web 228 may be in proportion to the decrease in height of the spar 210.

Figure 6:
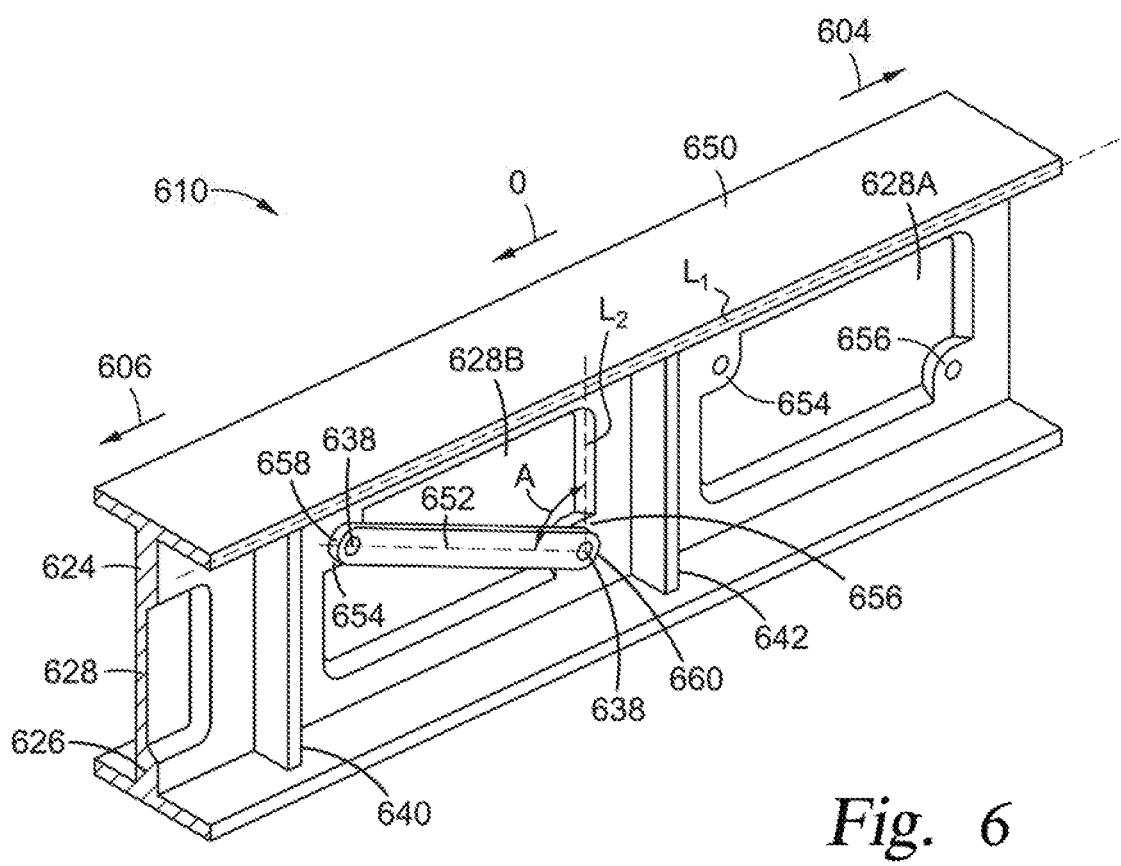
FIG. 6 is a perspective sectional view of a spar in accordance with one or more embodiments of the present disclosure.

FIG. 6 shows a perspective sectional view of a spar 610 in accordance with one or more embodiments of the present disclosure. The spar 610 may be included within a wing, such as for use as a front spar and/or a rear spar if more than one spar is included within the wing, with the spar 610 extending in an outboard direction indicated by arrow O. Thus, an inboard end 604 of the spar 610 is upstream of the arrow O, and an outboard end 606 of the spar 610 is downstream of the arrow O.

The spar 610 includes an upper chord 624, a lower chord 626, and one or more webs 628. The upper chord 624 and the lower chord 626, as shown in FIG. 6, each have a T-shaped cross section, but may also have other shaped cross-sections, such as an L-shaped cross-section, without departing from the scope of the present disclosure. The webs 628 extend between and are coupled to (e.g., formed with, discussed more below) the upper chord 624 and the lower chord 626. The webs 628 are shown as having a smaller thickness than the upper chord 624 and the lower chord 626.

One or more stiffeners 640 and/or one or more rib posts 642 are included within the spar 610. The stiffener 640 is positioned between and coupled to the upper chord 624 and the lower chord 626 to abut the upper chord 624 and the lower chord 626. The stiffener 640 is also positioned adjacent and between the webs 628. Similarly, the rib post 642 is positioned between and coupled to the upper chord 624 and the lower chord 626 to abut the upper chord 624 and the lower chord 626. The rib post 642 is positioned adjacent and between the webs 628. As such, the webs 628 may be defined between the stiffeners 640 (if present) and/or the rib posts 642, in which the webs 628 are shown as having a smaller thickness than the stiffeners 640 and the rib posts 642.

Referring still to FIG. 6, the spar 610 may be formed as or include a monolithic structure 650 in one or more embodiments, such as with the monolithic structure extending from the inboard end to the outboard end of the spar 610. In particular, the components of the spar 610 may be integrally formed with each other to form the monolithic structure 650. Thus, the upper chord 624, the lower chord 626, and the webs 628 may be integrally formed with each other to form the monolithic structure 650. Further, in an embodiment in which the stiffener 640 and/or the rib post 642 are included within the spar 610, the stiffener 640 and the rib post 642 may be integrally formed with each other to form the monolithic structure 650.

The spar 610 may increase in strength and structural rigidity by including the monolithic structure 650, such as compared to forming the components of a spar separately and then coupling the components to each other using permanent joints (e.g., welding) or non-permanent joints (e.g., fasteners). Further, the time needed to manufacture the spar 610 and/or a wing with the spar 610 may decrease by using the monolithic structure 650. For example, the monolithic structure 650 may be manufactured by using a three-dimensional (3D) printing process or a similar method. Additionally or alternatively, the monolithic structure 650 may be manufactured by milling from a bulk material. The monolithic structure 650 is formed from the same material throughout, such as metal (e.g., steel or aluminum) or has the same or consistent material throughout. Thus, the monolithic structure 650 may avoid using permanent and non-permanent joints or methods for coupling the components of the monolithic structure 650 to each other.

As the spar 610 may be formed from or include the monolithic structure 650, one or more components may be formed separate from and coupled to the monolithic structure 650 to improve reliability. For example, in an embodiment one or more components may be formed separate from and included with the monolithic structure 650 to reinforce the spar 610 and provide additional structural support and rigidity to the spar 610.

With reference to FIG. 6, the spar 610 may include one or more struts 652 coupled to the monolithic structure 650 as a reliability-enhancing component. The strut 652, which is shown as a bar or a rod, is distinct and separate from the monolithic structure 650, such as distinct and separate from the web 628, the upper chord 624, and the lower chord 626. The strut 652 may be removably coupled to the monolithic structure 650, and therefore the strut 652 and the monolithic structure 650 can be coupled and decoupled from each other, as desired, for removal or replacement.

The strut 652 is coupled to the monolithic structure 650 between the upper chord 624 and the lower chord 626 and extends across the web 628. For example, as shown, the monolithic structure 650 may include an upper pad 654 and a lower pad 656. The upper pad 654 is positioned or formed at a lower end of the upper chord 624 adjacent the upper chord 624 and the web 628. The lower pad 656 is positioned or formed at an upper end of the lower chord 626 adjacent the lower chord 626 and the web 628. The upper pad 654 and the lower pad 656 each have an increased thickness in cross-section with respect to the web 628. The strut 652 is coupled to the upper pad 654 and the lower pad 656 to extend across the web 628. In particular, an upper end 658 of the strut 652 is coupled to the upper pad 654, and a lower end 660 of the strut 652 is coupled to the lower pad 656. The strut 652 may be coupled to the monolithic structure 650 using permanent joints or non-permanent joints, such as by using fasteners 638 may be used to couple the strut 652 to the upper pad 654 and the lower pad 656 as shown. The strut 652 may be formed from the same or similar material as the monolithic structure 650, such as metal. Alternatively, as the strut 652 is separate from the monolithic structure 650, the strut 652 may be formed from a different material, such as a composite material, and coupled to the monolithic structure 650.

The strut 652 may be used to provide additional support and structure to the monolithic structure 650. For example, the strut 652 may be used to carry or redistribute the load or force between the upper chord 624 and the lower chord 626. Further, the strut 652 may be coupled to the monolithic structure 650 such that the strut 652 is positioned at an angle (e.g., a non-vertical) with respect to the upper chord 624 and the lower chord 626 that is oriented toward the outboard end 606 of the spar 610. For example, as shown in FIG. 6, the spar 610 is shown as having a longitudinal axis $L_1$ that extends along the length of the spar 610 between the inboard end 604 and the outboard end 606. A virtual vertical line $L_2$ is also shown that extends perpendicular to the longitudinal axis $L_1$ between the upper chord 624 and the lower chord 626. The strut 652 is positioned at an angle A with respect to the vertical line $L_2$. In such an embodiment, the angle A of the strut 652 orients the upper end 658 of the strut 652 (which is positioned adjacent the upper chord 624) closer or nearer to the outboard end 606 than the lower end 660 of the strut 652 (which is positioned adjacent the lower chord 626).

Non-monolithic spars have consistently shown that the lower chord experiences a highest amount of stress and loading within the spar (e.g., lower chord is in tension and the upper chord is in compression from lifting force across the spar when in use within a wing). Thus, in FIG. 6, the strut 652 may be oriented with respect to the spar 610 at the angle A and towards the outboard end 606 such that the upper end 658 of the strut 652 positioned adjacent the upper chord 624 is closer or nearer to the outboard end 606 than the lower end 660 of the strut 652. In such an orientation, the strut 652 is in tension to carry or redistribute the load from the lower chord 626 to the upper chord 624 to reinforce the lower chord 626. In such an embodiment, the strut 652 may more efficiently carry the load in tension than in compression. Further, the strut 652 is used to reinforce and support the spar 610, such as in particular the web 628. For example, in an embodiment in which a stress fracture occurs in the lower chord 626 from being overstressed, the strut 652 may be used to arrest the stress fracture within the lower chord 626. By arresting the stress fracture, the strut 652 may prevent the stress fracture from spreading into the web 628 and/or other components of the spar 610. Thus, the strut 652 may be used to provide additional support and increase the reliability of components of the spar 610.

The spar 610 may include one or more webs 628 and one or more struts 652. For example, the spar 610 may include multiple webs 628 that are distributed along the length of the spar 610 between the inboard end 604 and the outboard end 606. Further, the spar 610 may include multiple struts 652 that are distributed along the length of the spar 610 between the inboard end 604 and the outboard end 606. In one or more embodiments, each strut 652 may correspond to one of the webs 628 with each strut 652 extending across the corresponding web 628.

As discussed above, one or more dimensions of the spar 610 may vary or change, such as in proportion to the stress that is predicted to be experienced by the spar 610 at a predetermined area. For example, the predicted stress for the spar 610 to experience at a predetermined area may generally decrease from the inboard end 604 to the outboard end 606, in that the inboard end 604 of the spar 610 is expected to experience higher amounts of stress than the outboard end 606 of the spar 610. Further, in one or more embodiments, the lower chord 626 is expected to experience higher amounts of stress than the upper chord 624. Thus, one or more dimensions of the spar 610 may relatively increase for areas of relatively higher predicted stress, and correspondingly one or more dimensions of the spar 610 may relatively decrease for areas of relatively lower predicted stress.

Accordingly, one or more dimensions of the spar 610 may decrease from the inboard end 604 to the outboard end 606 and/or from the lower chord 626 to the upper chord 624. In one embodiment, the webs 628 may gradually decrease in thickness (e.g., cross-sectional thickness of the webs 628) when moving in the direction from the inboard end 604 to the outboard end 606 of the spar 610. Thus, a web 628A positioned closer to the inboard end 604 may have a larger thickness than a web 628B positioned closer to the outboard end 606. The thickness of the strut 652 corresponding to each web 628 may vary proportionally. For example, the struts 652 may gradually decrease in thickness when moving in the direction from the inboard end 604 to the outboard end 606 of the spar 610. Thus, a strut 652 positioned closer to the inboard end 604 may have a larger thickness than a strut 652 positioned closer to the outboard end 606. In another embodiment, the upper pads 654 and the lower pads 656 may gradually decrease in thickness (e.g., cross-sectional thickness) when moving in the direction from the inboard end 604 to the outboard end 606 of the spar 610. Thus, an upper pad 654 and a lower pad 656 positioned closer to the inboard end 604 of the spar 610 may have a larger thickness than an upper pad 654 and a lower pad 656 positioned closer to the outboard end 606 of the spar 610. In yet another embodiment, the lower pads 656 may have a relatively larger thickness than the upper pads 654, as the lower pads 656 may be expected to experience larger amounts of predicted stress than the upper pads 654. Thus, the dimensions of the spar 610, such as the thickness of various components, may be adequately adjusted to transfer stress and load within the spar 610 from the struts 652 to the webs 628 (or vice-versa) and/or the upper chord 624 and the lower chord 626.

Furthermore, the angle A of the struts 652 may vary, such as by having the angle A of the struts 652 increase from the inboard end 604 to the outboard end 606 of the spar 610. For example, a strut 652 positioned closer to the inboard end 604 may have a smaller (non-vertical) angle A than a strut 652 positioned closer to the outboard end 606. Thus, the angle A for the struts 652 increases in the direction from the inboard end 604 to the outboard end 606 of the spar 610 with respect to virtual vertical line $L_2$ extending between the upper chord 624 and the lower chord 626. The height between the upper chord 624 and the lower chord 626 of the spar 610 decreases from the inboard end 604 to the outboard end 606. As the height decreases, the strut 652 positioned between the upper chord 624 and the lower chord 626 is positioned at a greater non-vertical angle relative to the upper chord 624 and the lower chord 626 to accommodate the decreased height between the upper chord 624 and the lower chord 626.

A spar in accordance with the present disclosure that includes a monolithic structure may be included within a wing. For example, the spar may be used as the front spar 210 and/or the rear spar 212 in the wing 200 shown in FIG. 2. Thus, a spar in accordance with the present disclosure may be included within a wing that is coupled to a fuselage of an airplane. The wing, including the spar, may include one or more ribs coupled to the spar for internal support, and may include an top skin and a bottom skin to define the airfoil for the wing. Further, one having ordinary skill in the art will appreciate that a spar in accordance with the present disclosure may not be limited to the use of a monolithic structure as shown and discussed above. For example, the present disclosure may be used with non-monolithic structured spars. Thus, a spar in accordance with the present disclosure may include monolithic structures and non-monolithic structures. In one or more embodiments, a spar in accordance with the present disclosure may have increased structural rigidity. Further, the present disclosure may present a spar that increases the reliability and/or decreases the manufacturing time needed to manufacture the spar, the wing, or the airplane.

While the present disclosure has been described in detail in connection with only a limited number of embodiments, it should be readily understood that the present disclosure is not limited to such described embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The use of directional terms such as above, below, upper, lower, upward, downward, top, bottom, left, right, and the like are used in relation to the illustrative embodiments as depicted in the figures, the upward direction being toward the top of the corresponding figure and the downward direction being toward the bottom of the corresponding figure. However, these terms are not used to be limiting, and instead are only used for descriptive purposes with reference to the drawings, as the drawings and the embodiments described herein may be reoriented without departing from the scope of the present disclosure.

The term "about" and "substantially" is intended to include the degree of error or uncertainty associated with measurement of the particular quantity based upon the equipment available at the time of filing the application. For example, "about" and "substantially" can include a range of ±8% or 5%, or 2% of a given value.

Therefore, it is intended that the present disclosure not be limited to the particular embodiment described as the best mode contemplated for carrying out this present disclosure, but that the present disclosure will include all embodiments falling within the scope of the claims.

What is claimed is:

1. A wing for an aircraft, comprising:
   a spar comprising:
      a monolithic structure, the monolithic structure comprising an upper chord, a lower chord, and a web positioned between the upper chord and the lower chord; and
      a strut, distinct and separate from the monolithic structure, coupled to the monolithic structure between the upper chord and the lower chord and extending across the web, wherein
         the monolithic structure further comprises an upper pad positioned adjacent the upper chord and the web and a lower pad positioned adjacent the lower chord and the web;
         the strut is coupled to the upper pad and the lower pad; and
         a thickness of the strut varies proportionally to a thickness of the web.

2. The wing of claim 1, wherein the spar comprises an inboard end and an outboard end.

3. The wing of claim 2, wherein:
   the spar comprises a plurality of webs distributed along a length of the spar between the inboard end and the outboard end; and
   a thickness of the webs decreases in a direction from the inboard end to the outboard end of the spar such that an inboard web positioned closer to the inboard end comprises a larger thickness than an outboard web positioned closer to the outboard end.

4. The wing of claim 3, wherein:
   the spar comprises a plurality of struts, each strut corresponding to one of the plurality of webs; and
   the thickness of the struts vary proportionally to the thickness of the corresponding web.

5. The wing of claim 2, wherein:
   the strut comprises an upper end positioned adjacent the upper chord and a lower end positioned adjacent the lower chord; and
   the strut is positioned at an angle that is non-vertical relative to the upper chord and the lower chord and is oriented toward the outboard end of the spar such that the upper end of the strut positioned adjacent the upper chord is positioned nearer to the outboard end than the lower end of the strut positioned adjacent the lower chord.

6. The wing of claim 5, wherein:
the spar comprises a longitudinal axis extending along a length of the spar between the inboard end and the outboard end;
the spar comprises a plurality of struts distributed along the length of the spar between the inboard end and the outboard end of the spar; and
the angle of the struts relative to the upper chord and the lower chord increases in a direction from the inboard end to the outboard end of the spar such that the strut positioned closer to the inboard end of the spar is oriented at a smaller angle as compared to the strut positioned closer to the outboard end of the spar, the angle measured with respect to a virtual vertical line perpendicular to the longitudinal axis of the spar.

7. The wing of claim 1, further comprising fasteners to couple the strut to the upper pad and the lower pad.

8. The wing of claim 1, wherein the monolithic structure further comprises a stiffener positioned between the upper chord and the lower chord and adjacent the web.

9. The wing of claim 1, wherein the monolithic structure further comprises a rib post positioned between the upper chord and the lower chord and adjacent the web.

10. The wing of claim 9, wherein the spar comprises a front spar and a rear spar, the wing further comprising a rib coupled to a rib post of the front spar and a rib post of the rear spar.

11. The wing of claim 1, wherein the upper chord and the lower chord each comprise a T-shaped or an L-shaped cross-section.

12. A spar for a wing of an aircraft, comprising:
a monolithic structure comprising an upper chord and a lower chord, and a web positioned between the upper chord and the lower chord; and
a strut coupled to the monolithic structure between the upper chord and the lower chord, wherein
the monolithic structure further comprises an upper pad positioned adjacent the upper chord and a lower pad positioned adjacent the lower chord;
the strut is coupled to the upper pad and the lower pad; and
a thickness of the strut varies proportionally to a thickness of the web.

13. The spar of claim 12, wherein:
the upper pad is positioned adjacent the upper chord and the web and the lower pad is positioned adjacent the lower chord and the web.

14. The spar of claim 13, wherein:
the spar comprises an inboard end and an outboard end;
the spar comprises a plurality of webs distributed along a length of the spar between the inboard end and the outboard end;
the spar comprises a plurality of struts, each strut corresponding to one of the plurality of webs;
a thickness of the webs decreases in a direction from the inboard end to the outboard end of the spar such that an inboard web positioned closer to the inboard end comprises a larger thickness than an outboard web positioned closer to the outboard end; and
the thickness of the struts vary proportionally to the thickness of the corresponding web.

15. The wing of claim 12, wherein:
the spar comprises an inboard end and an outboard end;
the strut comprises an upper end positioned adjacent the upper chord and a lower end positioned adjacent the lower chord; and
the strut is positioned at an angle that is non-vertical relative to the upper chord and the lower chord and is oriented toward the outboard end of the spar such that the upper end of the strut positioned adjacent the upper chord is positioned nearer to the outboard end than the lower end of the strut positioned adjacent the lower chord.

16. The wing of claim 15, wherein:
the spar comprises a longitudinal axis extending along a length of the spar between the inboard end and the outboard end;
the spar comprises a plurality of struts distributed along the length of the spar between the inboard end and the outboard end of the spar; and
the angle of the struts relative to the upper chord and the lower chord increases in a direction from the inboard end to the outboard end of the spar such that the strut positioned closer to the inboard end of the spar is oriented at a smaller angle as compared to the strut positioned closer to the outboard end of the spar, the angle measured with respect to a virtual vertical line perpendicular to the longitudinal axis of the spar.

17. A method of supporting a spar comprising a monolithic structure, comprising:
receiving stress from a wing with the monolithic structure of the spar positioned within and supporting the wing; and
distributing the stress between an upper chord and a lower chord of the monolithic structure with a strut coupled to the monolithic structure, wherein
the monolithic structure further comprises a web positioned between the upper chord and the lower chord, an upper pad positioned adjacent the upper chord and the web and a lower pad positioned adjacent the lower chord and the web, wherein;
the strut is coupled to the upper pad and the lower pad; and
a thickness of the strut varies proportionally to a thickness of the web.

18. The method of claim 17, wherein:
receiving the stress comprises receiving tension in the lower chord of the monolithic structure and receiving compression in the upper chord of the monolithic structure; and
distributing the stress comprises receiving tension in the strut.

19. The method of claim 18, further comprising:
receiving a stress fracture within the lower chord from receiving tension in the lower chord; and
receiving additional tension in the strut, thereby arresting the stress fracture within the lower chord of the monolithic structure.

* * * * *